US006586501B1

(12) United States Patent
Dalton et al.

(10) Patent No.: US 6,586,501 B1
(45) Date of Patent: *Jul. 1, 2003

(54) AGGREGATES HAVING ATTACHED POLYMER GROUPS AND POLYMER FOAMS

(75) Inventors: Dennis M. Dalton, Derry, NH (US); David A. Kinsman, Watertown, MA (US); Lynn M. Krajkowski, Waltham, MA (US); Adam L. MacKay, Arlington, MA (US); Agathagelos Kyrlidis, Malden, MA (US)

(73) Assignee: Cabot Corporation, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/487,941

(22) Filed: Jan. 19, 2000

Related U.S. Application Data

(63) Continuation-in-part of application No. 09/317,287, filed on May 24, 1999.
(60) Provisional application No. 60/163,857, filed on Nov. 5, 1999, provisional application No. 60/163,716, filed on Nov. 5, 1999, provisional application No. 60/135,558, filed on May 24, 1999, and provisional application No. 60/116,500, filed on Jan. 20, 1999.

(51) Int. Cl.$^7$ ................................................ C08K 9/00
(52) U.S. Cl. ........................... 523/215; 521/82; 521/91; 524/492; 524/493; 524/495; 524/496; 523/216
(58) Field of Search .................................. 523/215, 216; 524/492, 493, 495, 496; 521/82, 91

(56) References Cited

U.S. PATENT DOCUMENTS

| 1,283,229 A | 10/1918 | Lee |
| 3,015,645 A | 1/1962 | Tyler |
| 3,122,520 A | 2/1964 | Lentz |
| 3,455,839 A | 7/1969 | Rauner |
| 3,486,967 A | 12/1969 | Fisher |
| 3,499,848 A | 3/1970 | Weisman |
| 3,556,158 A | 1/1971 | Schneider |
| 3,593,437 A | 7/1971 | Kogert |
| 3,634,604 A | 1/1972 | Lusk |
| 3,640,920 A | 2/1972 | Cear |
| 3,776,741 A | 12/1973 | Bockstie, Jr. |
| 3,800,031 A | 3/1974 | Sale et al. |
| 3,803,046 A | 4/1974 | Winyall et al. |
| 3,996,188 A | 12/1976 | Laur |
| 4,010,123 A | 3/1977 | Blunt et al. |
| 4,036,933 A | 7/1977 | Laufer et al. |
| 4,045,380 A | 8/1977 | Blunt et al. |

(List continued on next page.)

FOREIGN PATENT DOCUMENTS

| CA | 1 223 424 | 6/1987 |
| DE | 2 024 810 | 5/1969 |
| DE | 2 032 174 | 1/1972 |
| DE | 2 028 353 | 3/1980 |
| DE | 36 29 390 A1 | 2/1988 |
| DE | 195 33565 A1 | 3/1997 |
| DE | 196 49279 A1 | 6/1998 |
| DE | 197 02781 A1 | 7/1998 |
| DE | 197 06030 A1 | 8/1998 |
| DE | 197 28 543 | 1/1999 |
| DE | 198 12 856 | 9/1999 |
| EP | 0 026 920 A2 | 10/1980 |
| EP | 0 072 536 B1 | 8/1982 |
| EP | 0 091 828 B1 | 4/1983 |
| EP | 0 208 809 A2 | 10/1985 |
| EP | 0 186 887 A2 | 12/1985 |
| EP | 0 256 252 A1 | 6/1987 |

(List continued on next page.)

OTHER PUBLICATIONS

Barringer, C. M., Designing Rigid Urethane Foams for Low Moisture Permeability, *SPE Journal*, Nov. 1959.
Gluck, et al., Carbon Black–Filled Foam Insulations, 32nd Annual Polyurethane Technical/Marketing Conference, Oct. 1–4, 1989.
Knox, R.E., Insulation Properties of Fluorocarbon Expanded Rigid Urethane Foam, *Ashrae Journal*, Oct. 1962.
LaBras, L.R., Recent Developments in Rigid Urethane Foams, *SPE Journal*, Apr. 1960.
Saunders & Frisch, *Polyurethanes: Chemistry and Technology*, 1964.
Research Disclosure, p. 42551, Sep. 1999.
Research Disclosure, p. 42562, Sep. 1999.
Copy of U.S. patent application Ser. No. 09/317,287 filed May 24, 1999.
Copy of U.S. patent application Ser. No. 09/435,273 filed Nov. 5, 1999.

*Primary Examiner*—Morton Foelak

(57) ABSTRACT

An aggregate having attached at least one type of polymer is described, wherein the aggregate comprises at least one carbon phase and at least one silicon-containing species phase. Other aggregates which can have a polymer attached include, but are not limited to, an aggregate comprising at least one carbon phase and at least one metal-containing species phase and carbon black at least partially coated with silica. Methods of making the aggregate are further described which involve combining the starting aggregate with a reactive polymer and mixing in order to attach the polymer onto the aggregate. Uses of the aggregate are further described such as incorporating the aggregate into polymer foams and other polymeric products as well as elastomeric products. Polymer foam compositions are also described and contain polymer foam and chemically modified carbonaceous filler, specifically, carbonaceous filler having polymer moieties chemically bonded to the carbonaceous particulates. Exemplary carbonaceous fillers include carbon black, activated carbon, graphite, carbon fibers, fibrils and the like. The polymer moieties have a valence orbital bond to the carbonaceous particulate, such as an ionic or covalent bond. The chemical bond survives shear forces and the like, such as would be encountered by filler material in a reaction injection molding process for the manufacture of filled polyurethane foam insulation panels.

15 Claims, No Drawings

U.S. PATENT DOCUMENTS

| | | | |
|---|---|---|---|
| 4,048,105 A | 9/1977 | Salisbury | |
| 4,094,685 A | 6/1978 | Lester et al. | |
| 4,108,791 A | 8/1978 | Wasilczyk | |
| 4,137,199 A | 1/1979 | Brown et al. | |
| 4,152,503 A | 5/1979 | Short et al. | |
| 4,169,926 A | 10/1979 | McDaniel | |
| 4,231,901 A | 11/1980 | Berbeco | |
| 4,278,770 A | 7/1981 | Chandalia et al. | |
| 4,279,879 A | 7/1981 | Winyall et al. | |
| 4,282,329 A | 8/1981 | von Bonin et al. | |
| 4,303,641 A | 12/1981 | DeWolf, II et al. | |
| 4,305,796 A | 12/1981 | Gagliani et al. | |
| 4,307,127 A | 12/1981 | Shah | |
| 4,327,065 A | 4/1982 | von Dardel et al. | |
| 4,344,800 A | 8/1982 | Lutz | |
| 4,360,610 A | 11/1982 | Murray et al. | |
| 4,398,527 A | 8/1983 | Rynbrandt | |
| 4,432,956 A | 2/1984 | Zarzycki et al. | |
| 4,434,253 A | 2/1984 | Rys-Sikora | |
| 4,442,160 A | 4/1984 | Toba et al. | |
| 4,442,228 A | 4/1984 | Leupold et al. | |
| 4,443,253 A | 4/1984 | Weir et al. | |
| 4,444,673 A | 4/1984 | Joshi et al. | |
| 4,493,788 A | 1/1985 | Fujie et al. | |
| 4,500,659 A | 2/1985 | Kroupa et al. | |
| 4,505,973 A | 3/1985 | Neet et al. | |
| 4,517,319 A | 5/1985 | Reske et al. | |
| 4,525,297 A | 6/1985 | Yamane et al. | |
| 4,547,529 A | 10/1985 | Lee et al. | |
| 4,548,958 A | 10/1985 | Bauman et al. | |
| 4,567,212 A | 1/1986 | Bauman et al. | |
| 4,572,869 A | 2/1986 | Wismer et al. | |
| 4,596,725 A | 6/1986 | Kluth et al. | |
| 4,603,073 A | 7/1986 | Renalls et al. | |
| 4,610,863 A | 9/1986 | Tewari et al. | |
| 4,619,908 A | 10/1986 | Cheng et al. | |
| 4,621,106 A | 11/1986 | Fracalossi et al. | |
| 4,661,533 A | 4/1987 | Stobby | |
| 4,711,911 A | 12/1987 | Blount | |
| 4,731,401 A | 3/1988 | Moteki et al. | |
| 4,745,144 A | 5/1988 | Itoh et al. | |
| 4,760,099 A | 7/1988 | Canaday et al. | |
| 4,766,000 A | 8/1988 | Sobus | |
| 4,767,795 A | 8/1988 | Adam et al. | |
| 4,776,867 A | 10/1988 | Onorato et al. | |
| 4,778,636 A | 10/1988 | Krieg et al. | |
| 4,795,763 A | 1/1989 | Gluck et al. | |
| 4,891,399 A | 1/1990 | Ohkawa et al. | |
| 4,954,327 A | 9/1990 | Blount | |
| 5,010,112 A | 4/1991 | Glicksman et al. | |
| 5,015,448 A | 5/1991 | Vorlop et al. | |
| 5,069,816 A | 12/1991 | DeSantis et al. | |
| 5,071,703 A | 12/1991 | Weber et al. | |
| 5,075,343 A | 12/1991 | Blount | |
| 5,078,919 A | 1/1992 | Ashley et al. | |
| 5,100,923 A | 3/1992 | Hintz et al. | |
| 5,102,919 A | 4/1992 | Swab | |
| 5,110,840 A | 5/1992 | Blount | |
| 5,122,291 A | 6/1992 | Wolff et al. | |
| 5,122,305 A | 6/1992 | Ashley et al. | |
| 5,130,110 A | 7/1992 | Rouet et al. | |
| 5,137,190 A | 8/1992 | Plaud | |
| 5,137,659 A | 8/1992 | Ashley et al. | |
| 5,137,930 A | 8/1992 | Soukup | |
| 5,141,968 A | 8/1992 | Dietrich et al. | |
| 5,149,722 A | 9/1992 | Soukup | |
| 5,158,758 A | 10/1992 | Chieng et al. | |
| 5,169,926 A | 12/1992 | Keijsper et al. | |
| 5,192,607 A | 3/1993 | Soukup | |
| 5,210,105 A | 5/1993 | Paquet et al. | |
| 5,215,733 A | 6/1993 | Potter | |
| 5,240,647 A | 8/1993 | Ashley et al. | |
| 5,258,418 A | 11/1993 | Krueger et al. | |
| 5,260,347 A | 11/1993 | Krueger et al. | |
| 5,275,796 A | 1/1994 | Tillotson et al. | |
| 5,328,645 A | 7/1994 | Lin et al. | |
| 5,334,337 A | 8/1994 | Voelker et al. | |
| 5,338,783 A | 8/1994 | Olsen | |
| 5,340,866 A | 8/1994 | Evans | |
| 5,373,026 A | 12/1994 | Bartz et al. | |
| 5,380,464 A | 1/1995 | McGee et al. | |
| 5,397,807 A | 3/1995 | Hitchcock et al. | |
| 5,397,808 A | 3/1995 | Doerge et al. | |
| 5,409,683 A | 4/1995 | Tillotson et al. | |
| 5,461,098 A | 10/1995 | Hitchcock et al. | |
| 5,474,806 A | 12/1995 | Morgan et al. | |
| 5,506,302 A | 4/1996 | Shiono et al. | |
| 5,525,660 A | 6/1996 | Shiono et al. | |
| 5,529,777 A | 6/1996 | Andrianov et al. | |
| 5,531,929 A | 7/1996 | Kobayashi | |
| 5,540,767 A | 7/1996 | Ronlan | |
| 5,543,082 A | 8/1996 | McGee et al. | |
| 5,554,662 A | 9/1996 | Sanders et al. | |
| 5,558,849 A | 9/1996 | Sharp | |
| 5,565,497 A | 10/1996 | Godbey et al. | |
| 5,569,513 A | 10/1996 | Fidler et al. | |
| 5,571,847 A | 11/1996 | Hitchcock et al. | |
| 5,587,107 A | 12/1996 | Schwertfeger et al. | |
| 5,604,265 A | 2/1997 | De Vos et al. | |
| 5,616,628 A | 4/1997 | von Bonin et al. | |
| 5,633,584 A | 5/1997 | Maryanski et al. | |
| 5,647,962 A | 7/1997 | Jansen et al. | |
| 5,651,921 A | 7/1997 | Kaijou | |
| 5,680,713 A | 10/1997 | Forbert et al. | |
| 5,683,528 A | 11/1997 | Partlow et al. | |
| 5,698,606 A | 12/1997 | De Vos et al. | |
| 5,705,535 A | 1/1998 | Jansen et al. | |
| 5,708,069 A | 1/1998 | Burns et al. | |
| 5,709,058 A | 1/1998 | Shaw | |
| 5,801,210 A | 9/1998 | Radovich et al. | |
| 5,804,648 A | 9/1998 | Slack | |
| 5,859,081 A | 1/1999 | Duffy | |
| 5,977,213 A * | 11/1999 | Mahmud et al. | |
| 5,993,707 A | 11/1999 | Chaudhary et al. | |
| 6,258,864 B1 * | 7/2001 | Dalton et al. | 521/82 |

FOREIGN PATENT DOCUMENTS

| | | |
|---|---|---|
| EP | 0 293 060 A2 | 1/1988 |
| EP | 0 148 521 B1 | 1/1990 |
| EP | 0 434 225 B1 | 11/1990 |
| EP | 0 497 966 B1 | 8/1991 |
| EP | 0 653 377 A1 | 11/1993 |
| EP | 0 638 346 A2 | 7/1994 |
| EP | 0 657 517 A1 | 12/1994 |
| EP | 0 672 635 A1 | 3/1995 |
| EP | 0 702 119 A2 | 9/1995 |
| EP | 0 704 492 A2 | 9/1995 |
| EP | 0 798 371 A1 | 3/1996 |
| EP | 0 745 648 A2 | 5/1996 |
| EP | 0 767 199 A1 | 10/1996 |
| EP | 0 774 285 A2 | 11/1996 |
| EP | 0 802 229 A2 | 4/1997 |
| EP | 0 802 230 A2 | 4/1997 |
| EP | 0 884 338 A1 | 6/1998 |
| EP | 0 889 082 B1 | 6/1998 |
| EP | 0 930 323 A1 | 1/1999 |
| EP | 0 939 071 A1 | 2/1999 |
| EP | 0 943 667 A1 | 3/1999 |
| FR | 1 447 850 | 6/1966 |
| FR | 2 179 174 | 4/1973 |
| FR | 2 288 610 | 5/1976 |

| | | | | | |
|---|---|---|---|---|---|
| FR | 2 489 416 | 3/1982 | JP | 11 279254 | 10/1999 |
| FR | 2 512 736 | 3/1983 | WO | 91/13112 | 9/1991 |
| GB | 2 028 353 A | 3/1980 | WO | 94/13721 | 6/1994 |
| GB | 2 064 485 A | 6/1981 | WO | 95/15355 | 6/1995 |
| GB | 2 113 228 A | 8/1983 | WO | 95/15356 | 6/1995 |
| GB | 2 146 345 A | 4/1985 | WO | WO 96/13418 | 4/1998 |
| GB | 2 298 424 A | 9/1996 | WO | 98/23678 | 6/1998 |
| GB | 2 324 798 A | 11/1998 | WO | 98/35803 | 8/1998 |
| JP | 57 147510 | 9/1982 | WO | 99/31176 | 6/1999 |
| JP | 6 281414 | 10/1994 | WO | 99/47592 | 9/1999 |
| JP | 10 195225 | 10/1998 | | | |
| JP | 10 268629 | 10/1998 | * cited by examiner | | |
| JP | 10 292104 | 10/1998 | | | |

AGGREGATES HAVING ATTACHED POLYMER GROUPS AND POLYMER FOAMS

This application is a continuation-in-part of U.S. patent application Ser. No. 09/435,273, filed Nov. 5, 1999 (now abandoned), which is a continuation-in-part of U.S. patent application Ser. No. 09/317,287, filed May 24, 1999, now U.S. Pat. No. 6,258,864. This application further claims the benefit of following U.S. Provisional patent application Ser. Nos.: 60/116,500; 60/135,558; 60/163,716; and 60/163,857. U.S. patent application Ser. Nos. 09/317,287; 60/116,500; 60/135,558; 60/163,716; and 60/163,857 are incorporated herein in their entireties by reference.

BACKGROUND OF THE INVENTION

The present invention relates to aggregates, such as fillers, which are useful in a variety of applications such as elastomeric compositions, polymeric compositions, and the like. The present invention further relates to methods of making these aggregates. The present invention also relates to polymer foams, especially closed-cell polymer foams useful for thermal insulation applications and the like, containing surface-modified carbonaceous fillers. The present invention further relates to novel compositions useful in the manufacture of such polymer foams.

Carbon blacks are widely used as pigments, fillers, and reinforcing agents in the compounding and preparation of rubber and other elastomeric and polymeric compounds. Carbon blacks are particularly useful as reinforcing agents in the preparation of elastomeric compounds used in the manufacture of tires and other articles.

Carbon blacks are generally produced in a furnace-type reactor by pyrolyzing a hydrocarbon feedstock with hot combustion gases to produce combustion products containing particulate carbon black. Carbon black exists in the form of aggregates. The aggregates, in turn are formed of carbon black particles. However, carbon black particles do not generally exist independently of the carbon black aggregate. Carbon blacks are generally characterized on the basis of analytical properties, including, but not limited to, particle size and specific surface area; aggregate size, shape, and distribution; and chemical and physical properties of the surface. The properties of carbon blacks are analytically determined by tests known to the art. For example, nitrogen adsorption surface area (measured by ASTM test procedure D3037- Method A or D4820-Method B) and cetyl-trimethyl ammonium bromide adsorption valve (CTAB) (measured by ASTM test procedure D3765 [09.01]), are measures of specific surface area. Dibutylphtalate absorption of the crushed (CDBP) (measured by ASTM test procedure D3493-86) and uncrushed (DBP) carbon black (measured by ASTM test procedure D2414-93), relates to the aggregate structure. The bound rubber value relates to the surface activity of the carbon black. The properties of a given carbon black depend upon the conditions of manufacture and may be modified, e.g., by altering temperature, pressure, feedstock, residence time, quench temperature, throughput, and other parameters.

Silica is also used as a reinforcing agent (or filler) for elastomers. However, using silica alone as a reinforcing agent for elastomers leads to poor performance compared to the results obtained with carbon black alone as the reinforcing agent. It is theorized that strong filler-filler interaction and poor filler-elastomer interaction accounts for the poor performance of silica. The silica-elastomer interaction can be improved by chemically bonding the two with a chemical coupling agent, such as bis (3-triethoxysilylpropyl) tetrasulfane, commercially available as Si-69 from Degussa AG, Germany. Coupling agents such as Si-69 create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysteresis balance. However, elastomer compounds containing silica as the primary reinforcing agent exhibit low thermal conductivity, high electrical resistivity, high density, and poor processability.

When carbon black alone is used as a reinforcing agent in elastomeric compositions, it does not chemically couple to the elastomer but the carbon black surface provides many sites for interacting with the elastomer. While the use of a coupling agent with carbon black might provide some improvement in performance to an elastomeric composition, the improvement is not comparable to that obtained when using a coupling agent with silica.

In addition, polymer foams containing filler materials, such as particulate filler materials, are widely known and used in innumerable applications. Closed cell rigid polymer foams, especially polyurethane and polyisocyanurate foams containing particulate filler, such as carbon black or other particulate filler, are widely used for thermal insulation purposes. Foams of this type and their use for thermal insulation purposes are disclosed, for example, in U.S. Pat. No. 5,604,265 to DeVos et al. Also, in U.S. Pat. No. 5,373,026 to Bartz et al, polymer foam structures incorporating carbon black filler are taught for thermal insulation purposes. These patents are incorporated herein in their entirety by reference.

In polymer foams such as, for example, polyurethane and polyisocyanurate foams, cost reduction and/or thermal insulation improvement can be achieved by improving dispersion of filler material in the foam, by controlling foam cell size, and/or by increasing infrared absorption.

In polymer foams, such as polyurethane and polyisocyanurate foams, the windows of the cell structure are believed to be mostly transparent to infrared radiation. The thermal conductivity of these foams should be improved by increasing the infrared absorption of the cell windows. One way to do this is to add infrared absorbing materials, such as carbon black, to the foam in an effort to improve the infrared absorption of the cell windows. However, the distribution of carbon black in these foams is poor and the majority of carbon black resides in the struts of the foam. In other words, the windows of the foams contain little or no carbon black. In fact, it is doubtful that prior work has achieved carbon black concentrations in the windows equivalent to the carbon black concentration found in the struts.

There is a recognized need in the polymer foam industry for foams having improved performance characteristics and/or reduction in the cost and complexity of manufacturing such foams. In certain applications, such as foam insulation, in refrigeration units or other appliances, or for architectural insulation, this need has been increased due to the loss of insulation performance caused by the reduction or elimination of halogenated blowing agents. Some substitute blowing agents are found to produce foams having higher thermal conductivity. Hence, there is an increased need for lowering the thermal conductivity of polymer foams suitable for use in various insulation applications, particularly appliance and architectural thermal insulation uses.

Accordingly, there is a desire to provide improved fillers which will, when incorporated into elastomeric or polymeric materials, provide improved properties and/or overcome one or more of the difficulties described above.

SUMMARY OF THE INVENTION

A feature of the present invention is to provide an aggregate which can be incorporated into elastomeric and/or polymeric materials and provide at least one enhanced property.

Another feature of the present invention is to provide a filler material which can be incorporated into polymeric foams.

Another feature of the present invention is to provide a filler material which can be incorporated into such articles as tires and the like.

It is a further feature of the present invention to provide improved polymer foams. It is a particular feature of the present invention to provide polymer foams having lower thermal conductivity, or, the alternative, lower thermal conductivity per unit cost of the foam. In accordance with certain preferred embodiments of the invention, it is a feature to provide rigid, closed cell polymer foams incorporating surface modified particulate filler materials not previously used for such applications, and being suitable for various insulation purposes.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purpose of the present invention, as embodied and broadly described herein, the present invention relates to an aggregate having attached at least one polymer wherein the aggregate comprises at least a carbon phase and a silicon-containing species phase.

The present invention further relates to an elastomeric composition containing at least one elastomer and the aggregates of the present invention.

The present invention also relates to a polymer foam containing the aggregates of the present invention.

The present invention further relates to polymer compositions containing at least one polymer and the aggregates of the present invention.

Furthermore, the present invention relates to a method of making the aggregates of the present invention which involves the steps of combining an aggregate comprising at least a carbon phase and a silicon-containing species phase with at least one reactive polymer having a functional group(s) and mixing to form an aggregate having attached at least one polymer. Preferably, in this method, heat or other means is also applied in order to decrease the reaction time for the attachment to take place.

In addition, the present invention relates to novel polymer foams which comprise certain chemically modified carbonaceous ("CMC") fillers, that is, chemically modified carbonaceous material dispersed in the polymer foam. The chemically modified carbonaceous filler employed in the present invention comprises carbonaceous particulate material carrying polymer units, optionally being chemically functionalized polymer units, attached to the surface of the particles. As disclosed and described further below, the chemically modified carbonaceous filler comprises carbonaceous material having polymer moiety attachments.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention, in part, relates to an aggregate which has attached at least one polymer. The starting aggregate is preferably an aggregate having at least one carbon phase and at least one silicon-containing species phase. The attachment of the polymer is preferably on the surface of the starting aggregate and more preferably is a chemical attachment which is preferably by way of covalent bonding, although other types of attachments can be used in the present invention.

The starting aggregate of the present invention can be the aggregates described in U.S. Pat. Nos. 5,948,835; 5,919,841; 5,904,762; 5,877,238; 5,869,550; 5,863,323; 5,830,930; 5,749,950; 5,622,557; and 5,747,562. Furthermore, the starting aggregates described in WO 98/47971; WO 96/37547; and WO 98/13418 can also be used, and each of these patents and publications are incorporated in their entireties by reference herein.

For purposes of the present invention, the starting aggregate comprising at least a carbon phase and a silicon-containing species phase is also known as a silicon-treated carbon black. Preferably, the silicon-treated carbon black that is used, has the ability, when used in an elastomer, to impart to the elastomer poorer abrasion resistance, comparable or higher loss tangent at low temperature, and a lower loss tangent at high temperature, compared to a carbon black. The starting aggregate comprising at least a carbon phase and a silicon-containing species phase can be made in the manner described in these patents and publications.

As an alternative, in lieu of the starting aggregate comprising at least a carbon phase and a silicon-containing species phase, the starting aggregate can be a carbon black which is at least partially coated with silica. Examples of such an aggregate are described in U.S. Pat. No. 5,916,934 and WO 98/13428, which are incorporated in their entireties by reference herein the carbon black at least partially coated with silica can be made as described in U.S. Pat. No. 5,916,934.

Besides the above-described starting aggregates, the starting aggregate can also be an aggregate comprising at least a carbon phase and a metal-containing species phase as described in PCT Publication WO 98/47971 which are both incorporated in their entirety by reference herein.

For purposes of the present invention, the starting aggregate used to attach a polymer is preferably an aggregate comprising at least a carbon phase and a silicon-containing species phase. More preferably, the aggregate is such that a large portion of the silicon-containing species phase is exposed at the surface of the aggregate. Thus, it is preferred that the silicon-containing species phase is present primarily at or near the surface of the aggregate but is still part of the same aggregate as the carbon phase. As an example, an aggregate having the silicon-containing species phase exposed to about 1% to about 50% or more of the surface area of the aggregate is preferred.

In addition, preferably, the silicon-containing compounds used to form the silicon-containing phase of the aggregate are as follows. Useful volatilizable silicon-containing compounds include any such compound which is volatilizable at carbon black reactor temperatures. Examples include, but are not limited to, silicates such as tetraethoxyorthosilicate (TEOS) and tetraethoxyorthosilicate, silanes for example, alkoxysilanes, alkylalkoxysilanes, and arylalkylalkoxysilanes, for example, tetramethoxysilane, tetraethoxysilane, methyltrimethoxy-silane, methyltriethoxy silane, dimethyldimethoxysilane, dimethyidiethoxysilane, trimethylmethoxysilane, trimethylmethoxysilane, diethylpropylethoxysilane, halogen-organosilanes for example, tetrachlorosilane, trichloromethylsilane, dimethyldichlorosilane, trimethylchlorosilane, methyletliyldichlorosilane, dimethylethylchlorosilane, dimethylethylbromosilane, silicone oil, polysiloxanes and cyclic polysiloxanes for example, octamethylcyclotetrasiloxane (OMTS), decamethylcyclopentasiloxane, dodecamethylcyclohexasiloxane, hexamethylcyclotrisi loxane, and silazanes for example, hexamethyldisilazane. Besides volatilizable compounds, decomposable silicon-containing compounds which are not necessarily volatilizable can also be used to yield the silicon-treated carbon black. Silicon-containing compounds which may be used are set forth in *Encyclopedia of Science and Engineering*, Vol. 15, $2^{nd}$ Ed pp. 204–308, and UK Patent Application 2 296 915, both incorporated herein by reference. The usefulness of these compounds can be readily determined for their volatilizability and/or decomposability. Low molecular weight silicon-containing compounds are preferred. The flow rate of the volatilizable compound will determine the weight percent of silicon in the silicon-treated carbon black.

The preferred starting aggregate of the present invention can be characterized by one or more of the following various properties. For instance, the aggregate can have a rough surface characterized by the difference between BET ($N_2$) surface area and t-area which preferably ranges from about 2 to about 100 $m^2/g$. For an aggregate with t-area above 100 $m^2/g$, the difference between BET ($N_2$) surface area and t-area is preferably from about 10 to about 50 $m^2/g$. The surface roughness of HF treated aggregate is characterized by the difference between BET ($N_2$) surface area and t-area, which generally ranges from about 1 to about 50 $m^2/g$, and more preferably from about 5 to about 40 $m^2/g$. After HF treatment, the aggregate still has a rough surface. The surface roughness of the HF treated aggregate is characterized by the ratio of the difference in BET ($N_2$) surface area between the aggregate after and before HF treatment to the silicon content (in weight percentage) of the original aggregate sample without HF treatment. This ratio is preferably from about 0.1 to about 10 and more preferably from about 0.5 to about 5. The weight average aggregate size measured by DCP after HF treatment is reduced generally by about 5% to about 40% compared to an untreated aggregate. A significant amount of silica can remain in the aggregate after HF treatment. The remaining silica ash content preferably ranges from about 0.05% to about 1% based on the weight of the HF treated sample. This amount of silica ash in the aggregate comprises silica ash originating from the silicon-containing compound, and not from any carbon black-yielding feedstock. The BET surface area of the silica ash in the aggregate made after thermal treatment in air at 500° C. generally ranges from about 200 $m^2/g$ to about 1000 $m^2/g$, and preferably ranges from about 200 $m^2/g$ to about 700 $m^2/g$. As stated earlier, any combination is possible for the various properties and the aggregate can have one, and two, any three, any four, any five, or all of the properties. Additionally, all of these aggregates can generally contain sulfur and/or nitrogen levels between about 0.1 and about 5 wt %, based on the weight of the aggregate. The weight percent of silicon in the silicon-treated carbon black preferably ranges from about 0.1% to about 25%, and more preferably from about 0.5% to about 10%, and most preferably from about 4% to about 10% by weight or from about 8% to about 15% by weight of the aggregate. From an economical point of view, the use of less silicon is preferable to the extent that it reduces the cost to make the aggregate, provided acceptable performance characteristics are achieved. It has been found that injecting a silicon-containing compound into the carbon black reactor can result in an increase in the structure (e.g., CDBP) of the product.

With respect to the polymers which are attached onto the aggregate, any polymer capable of attaching onto the aggregate can be used in the present invention. Examples of the starting polymers which can be reacted with the starting aggregate include, but are not limited to, hydroxy terminated polymers, amine terminated polymers, and the like. Preferable, the starting polymer, which is reacted and thus attached with the starting aggregate, is a silane containing polymer and more preferably is a siloxane type polymer such as a polydimethylsiloxane. Other examples of preferred polymers which can be attached include, but are not limited to, polyethers, methacrylates, polyvinyl alcohols, polyalkylenes, and the like. Further examples include polyethylene, poly(vinylchloride), polyisobutylene, polycaprolactam (nylon), polyisoprene, polyamides, polycarbonates, polyelectrolytes, polyesters, polyethers, polyalkylene oxides, (polyhydroxy)benzenes, polyimides, polymers containing sulfur, polyolefins, polyols, polymethylbenzenes, polystyrene, styrene copolymers, acetal polymers, acrylic polymers, acrylonitrile polymers and copolymers, polyolefins containing halogen, fluoropolymers, ionomeric polymers, polysacchiarides, polymers containing ketone group(s), liquid crystal polymers, polyamide-imides, polymers containing olefinic double bond(s), polyolefin copolymers, polyphenylene oxides, polyurethanes, thermoplastic elastomers, silicone polymers, alkyd, epoxy, and unsaturated polyester and combinations thereof.

Further, as can be seen, the polymer attached can be a hydrocarbon-type polymer. All of these starting polymers are commercially-available or can be made by methods known to those skilled in the art.

The aggregate of the present invention can be prepared in any manner which leads to the attachment of the polymer onto the aggregate. Preferably, the aggregate is combined with the starting polymer having at least one functional group, such as a hydroxy group, silanol group, carbinol/alcohol group (e.g., C—OH), Si—OR groups, where R is an alkyl group, Si—X groups where X is a halide, or an amine group. The starting aggregate and the starting polymer with the functional group(s) are combined together and mixed preferably under low to mid shearing conditions in order to uniformly distribute the starting polymer throughout the starting aggregate. The starting polymer can over time attach itself onto the aggregate, preferably by way of the condensation of the functional group, though other reaction mechanisms are possible. To expedite the reaction time, heat can be applied and the heat can be a mild heat or temperatures up to the point where the polymer will break down such as about 300° C. or below. Preferably, the temperature applied, if used, is from about 35 to about 275° C. and more preferably is from about 50 to about 120° C. Other means to catalyze the reaction can be used. For purposes of the present invention, the functional group can be located anywhere on the starting polymer. Preferably, the functional group is located at the end of the polymer. Also, more than one type of functional group can be present.

Once the reaction in complete, at least some of the functional groups of the polymers are displaced off the polymer and the remaining parts of the polymer are attached onto the aggregate. For purposes of the present invention, the polymer can attach to any phase of the aggregate and is preferably attached primarily to the silicon-containing species phase when such an aggregate is used.

The amount or ratio of starting aggregate to starting reactive polymer can be any amount depending upon the desired level of attachment onto the aggregate. Preferably, the ratio of aggregate to reactive polymer for the reaction is from about 30:1 to about 1:10 and more preferably is from about 20:1 to about 1:5 and most preferably is from about 10:1 to about 1:1.

The starting polymer can be present as a liquid or solid, such as a powder. If a powder or the like is used, preferably the powder is dissolved or dispersed in a solvent.

For purposes of the present invention, more than one type of polymer can be attached to the same aggregate or a mixture of aggregates can be used wherein a portion of the aggregates have one type of polymer attached and another portion of aggregates have a different type of polymer attached.

The level of the reactive polymer attached onto the aggregate can be any amount and depends upon the surface area of the aggregate and further depends upon the desired use for the aggregate. Preferably and only as an example, the amount of reactive polymer attached onto the aggregate is preferably from about 0.01 mmol/g to about 3.0 mmol/g, more preferably from about 0.03 mmol/g to about 2.0 mmol/g, and most preferably from about 0.05 mmol/g to about 1.0 mmol/g of aggregate.

Besides the attachments described above, the aggregate either prior to attachment of the reactive polymer or afterwards or even during the attachment of the reactive polymer can have other organic groups attached onto the aggregate. These organic groups are further identified and preferred methods of attachment are set forth in U.S. Pat. Nos. 5,922,118; 5,900,029; 5,895,522; 5,885,335; 5,851,280; 5,803,959; 5,747,563; 5,713,988; 5,707,432; 5,700,845; 5,698,016; 5,672,198; 5,630,868; 5,554,739; 5,955,232 and all of these patents are incorporated in their entireties by reference herein including their uses. If an organic group is additionally attached to the aggregate, preferably, this organic group comprises at least one aromatic group and/or at least one alkyl group and more preferably the alkyl or aromatic group is directly attached to the aggregate.

In addition, mixtures of various treated aggregates can be combined. In other words, it is within the bounds of this invention to also use a mixture of other filler materials with the aggregates of the present invention or with the chemically modified carbonaceous fillers described below. Any combinations of additional components with the aggregates of the present invention may be used such as one or more of the following:

a) silicon-treated carbon black with an attached organic group optionally treated with silane coupling agents;

b) modified carbon black having an attached organic group;

c) carbon black at least partially coated with silica;

d) silica;

e) modified silica, for example, having an attached coupling group; and/or f) carbon black.

In a further embodiment of the present invention, novel polymer foams are provided which comprise certain chemically modified carbonaceous ("CMC") fillers, that is, chemically modified carbonaceous material dispersed in the polymer foam. The chemically modified carbonaceous filler that can be used in the present invention include carbonaceous particulate material having attached polymer units, optionally being chemically functionalized polymer units, attached to the surface of the particles. In accordance with preferred embodiments, the chemically modified carbonaceous filler is carbonaceous particulate filler, such as carbon black, graphite, activated carbon, and the like, which has been surface-modified to attach multiple polymer moieties per filler particle. Suitable chemically modified carbonaceous filler materials include, for example, particulate fillers sold by Cabot Corporation, Boston, Mass., USA, under the trademark ChemBlack®. Suitable modified carbon black filler materials include those disclosed in any of the following citations, the entire disclosures of which are incorporated herein by reference: U.S. Pat. Nos. 5,672,198; 5,571,311; 5,630,868; 5,707,432; 5,803,959; 5,554,739; 5,698,016; and 5,713,988; and published applications WO 96/18688; WO 97/47697; and WO 97/47699, all relating to carbon products and pigments having attached organic groups; U.S. Pat. Nos. 5,747,562; and 5,622,557; and Published Applications WO 96/37547; and WO 98/13418, all relating to silicon-treated carbon black; and Published Application WO 98/13428; relating to silica coated carbon black; and U.S. patent applications Ser. No. 08/962,244; U.S. Ser. No. 08/968,299; U.S. Ser. No. 09/089,363; U.S. Ser. No. 09/089,263; and U.S. Ser. No. 09/181,926, all relating to stable free radical attachment of groups. For purposes of the present invention, the aggregates having attached at least polymers described earlier, can also be considered chemically modified carbonaceous materials as well. Further, mixtures of any of these filler materials may be used in the polymer foams of the present invention.

The polymer moieties of the chemically modified carbonaceous fillers are directly attached to the surface of the carbonaceous particles, preferably by ionic, covalent, or an equivalent chemical bond. Thus, these filler materials incorporated into the polymer foams of the present invention are not polymeric coatings on carbonaceous particles. Mere coatings have not been sufficiently processible and have not provided the needed improvement in thermal insulation performance or cost reduction in commercially manufactured polymer foams. Mere polymeric coatings on carbonaceous filler particulates, such as were obtained by mixing surfactants or other polymers with filler materials, especially if the polymers were of a type and polymer chain length effective to provide substantially improved thermal insulation value in the finished polymer foam, can be stripped in substantial quantity from the carbonaceous particles by the shear forces encountered in commercial polymer foam manufacturing methods. The shear forces encountered in commercial reaction injection molding (RIM) methods, for example, have been found to strip substantial quantities of polymeric coatings from carbonaceous particles, such as carbon black or the like.

In contrast, the chemically modified carbonaceous fillers of the present invention for use as fillers in polymer foams, particularly the preferred embodiments, are not stripped in substantial quantity from the carbonaceous particles even under shear forces encountered in commercial polymer foam manufacture. In accordance with preferred embodiments, the chemically modified carbonaceous fillers comprise surface-modified carbonaceous particulate material preferably having at least one attached polymer moiety, which preferably remains attached to the carbonaceous particles even under shear forces encountered in RIM processes for manufacturing polymer foam insulation and the like. While not wishing to be bound by theory, at least certain preferred embodiments of the chemically modified carbonaceous fillers of the present invention can have valence-orbital interactions with the surface of the carbonaceous particle or with a functional group which is itself likewise attached to the carbonaceous particle. As disclosed and described further below, the chemically modified carbonaceous filler can be prepared by attaching polymeric moieties to the surface of carbonaceous particulate material. The polymeric moieties may be oligomeric. Suitable carbonaceous particulate materials to be modified include, but are not limited to, carbon black, activated carbon, graphite, charcoal, activated charcoal, carbon fibers, fibrils, and the like. Also, suitable carbonaceous particulate materials to be modified include the starting aggregates described earlier.

The chemically modified carbonaceous filler can be present in the polymer foam at conventional amounts. Preferably the chemically modified carbonaceous filler is used in an amount of from about 0.1 to about 18.0 weight percent filler or more in the final foam composition, more preferably from about 1.0 to about 12.0 weight percent, e.g., about 8.0 wt. %. Preferably, the modified carbon black filler is used in an amount of from about 0.1 to about 10.0 weight percent filler in the final foam composition, more preferably from about 1.0 to about 5.0 weight percent, e.g., about 4.0 wt %.

In accordance with preferred embodiments, chemically modified carbonaceous filler employed in the polymer foams provide improved thermal insulation value higher than corresponding unfilled foams, and higher than corresponding foams containing corresponding conventional carbonaceous filler not having polymer moieties attached thereto. This improvement may derive, in part, from better processability of the filler, especially better processability using commercially available foam production materials, equipment, and techniques, leading to better dispersion of the filler in the foam. In certain embodiments, the improvement may derive, in part, from preferential locating of the chemically modified carbonaceous filler in the windows of the foam, as further discussed below.

In accordance with another aspect, rigid, closed cell polymer foams are provided, comprising chemically modified carbonaceous filler disclosed above. Certain preferred embodiments are rigid, closed cell polymer foams with chemically modified carbonaceous fillers, incorporating non-CFC blowing agents and/or the reaction product thereof following manufacture of the foam. In accordance with certain preferred embodiments, polyurethane foams are provided, comprising chemically modified carbonaceous filler dispersed in the foam In accordance with certain preferred embodiments, polyisocyanurate foams are provided, comprising chemically modified carbonaceous filler dispersed in the foam In accordance with certain preferred embodiments, polystyrene foams are provided, comprising chemically modified carbonaceous filler dispersed in the foam.

In accordance with another aspect, polyurethane foams, polyisocyanurate foams, and/or polystyrene foams are provided, comprising chemically modified carbonaceous filler dispersed in the foam. In accordance with certain especially preferred embodiments, rigid, closed cell polyurethane foams, polyisocyanurate foams, and/or polystyrene foams, incorporate modified carbon black filler formed by reacting a suitable carbon black material with a polystyrene functionalizing reactant to place functional groups on the surface of the carbon black particles. In accordance with certain embodiments, the modified carbonaceous filler bears functional groups, such as C1 to C20 groups, e.g., C1 to C8 groups, selected from isocyanates, acyl azides, alcohols, amines, thiols, alkoxides, or mixtures thereof.

In accordance with certain preferred embodiments, the chemically modified carbonaceous filler is surface modified carbon black dispersed in either the polyol or the isocyanate reactive component (or both) of a polyurethane foam system. In accordance with another aspect, polymer foam, preferably rigid polyurethane or polyisocyanurate foam, comprise chemically modified carbonaceous filler which can be the reaction product of carbonaceous particulate material which has been treated with any of various suitable silanes and/or silicone materials. While not wishing to be bound by theory, it is presently understood that the surface chemistry of the carbonaceous material is modified by such treatnent with the silanes or silicone materials. Preferably, the silane materials contain functional groups, such as amines and/or alcohols, that are reactive with isocyanates. Suitable silicone treatment materials include silicone surfactants, such as silicone/ethylene oxide or silicone/propylene oxide copolymers to treat the carbon black particulate material to form the modified carbon black particulate fillers. Preferably the carbonaceous particulate material has as part of its surface chemistry, regions which can bond with the silanes, silicones, or silicone surfactants. Optionally, such surface regions are siliceous in nature, containing silanol groups. Silanes, silicones and silicone surfactants having as part of their structure hydroxy (Si—OH) and/or alkoxy groups (e.g., Si—OR, where R is an alkyl group) are preferred for use in such embodiments. While not wishing to be bound by theory, it is presently understood that condensation of these silanes, silicones or silicone surfactants with the silanol groups of the carbonaceous particulate material results in surface modification of the particulate material whereby the silanes, silicones or silicone surfactants are attached to the surface of the particulates. In accordance with certain preferred embodiments, these surface functionalized carbonaceous particulate fillers are dispersed in either the polyol or the isocyanate reactive component (or both) of a polyurethane foam system. Modified carbonaceous particulate fillers of this type, when incorporated into rigid closed-cell polyurethane foams in accordance with certain especially preferred embodiments, are found in higher concentrations in the windows of the foam cells than is achieved using the same polymer system with corresponding untreated carbon black particulate materials. In particular, more of the modified carbonaceous particulate filler is found at the gas/solid interface in the polyurethane foam. This improved distribution of the filler material results in lower thermal conductivity of the foam in comparison to the same foam containing the corresponding untreated carbon black material.

Chemically modified carbonaceous fillers of this type, when incorporated into rigid closed-cell polyurethane foams in accordance with certain especially preferred embodiments, have higher concentrations in the windows of the foam cells than is achieved using the same polymer system with corresponding untreated carbon black particulate materials. In particular, more of the modified carbonaceous particulate filler is at the gas/solid interface in the polyurethane foam. This improved distribution of the filler material results in lower thermal conductivity of the foam in comparison to the same foam containing the corresponding untreated carbon black material.

In accordance with certain preferred embodiments, about ninety percent (90%) of the chemically modified carbonaceous filler is present in the struts portion of the foam cells and the remaining about ten percent (10%) is present in the windows of the foam cells. More preferably, only about eighty percent (80%) of the chemically modified carbonaceous filler is present in the struts and at least about twenty percent (20%) is present in the windows. In a further alternative embodiment, the particle density of the chemically modified carbonaceous filler in the windows portion of the foam cells is greater than twenty percent (20%). Alternatively, about seventy percent (70%) of the modified carbonaceous particulate filler is present in the struts and at least about thirty percent (30%) in present in the windows. In a further alternative embodiment, the particle density of the modified carbonaceous particulate filler in the windows portion of the foam cells is equal to or greater than that found in the struts portions of the foam cells.

In accordance with one aspect, closed cell polymer foam is provided, comprising modified carbonaceous particulate filler, wherein a disproportionately high proportion of the modified carbonaceous particulate filler is located in the windows portions of the foam cells and a correspondingly low proportion of the modified carbon black particulate filler is located in the struts portions of the foam cells.

In accordance with certain preferred embodiments, closed-cell polymer foam, preferably polyurethane, or polyisocyanurate foam, contains chemically modified carbonaceous filler in the form of surface-modified (e.g., specifically, chemically bonded to polymeric moieties, as discussed above) carbon black, activated carbon, charcoal, activated charcoal, graphite, carbon fibers, or fibrils, or mixtures of any one or more of them. Preferably such chemically modified carbonaceous fillers provide functional groups effective to preferentially locate the individual particles at the gas/solid interface within the foam, especially in the windows of the foam cells. Preferred functional groups for these chemically modified carbonaceous fillers include, for example, aryl groups, alkyl groups, ketone groups, silane groups, ether groups, fluorinated aryl and alkyl groups, alkyl ester and alkyl ether groups, ketone, pyrrolidinones, polyethers, poly(alkyleneoxide) groups, poly(fluoroether) groups, and poly(dialkylsiloxane) groups.

Preferably, such surface functionality is attached to the surface of the carbonaceous filler by reaction of substituted diazonium salts with the carbonaceous materials. Suitable reaction methods and materials are disclosed above and in, for example, the United States patents recited above, the entire disclosures of which are incorporated herein by reference. The surface modification preferably occurs via covalent attachment of the functional groups to the surface of the carbonaceous material, though other attachments are possible. In accordance with other preferred embodiments, the aforesaid surface modification for attachment of the functional groups can be achieved by grafting of polymers to the surface of the carbon black via radical reactions. Examples of radical reactions include the reaction of stabilized free radical polymers with the carbonaceous filler. In accordance with other preferred embodiments, further functionalization of the attached groups is possible, for example, by growing polymers from the surface of the carbonaceous particle such as by using ionic or free radical polymerization techniques. These and other suitable surface modification techniques and materials and their suitability for use in the present invention will be apparent to those skilled in the art given the benefit of the present disclosure.

In accordance with another aspect, closed-cell polymer foam, preferably polyurethane foam, incorporates chemically modified carbonaceous filler to impart improved dispersion of the filler in either the isocyanate component or the polyol component of a polyurethane foam system. The improved filler dispersion reduces thermal conductivity of the resulting polyurethane foam. In contrast, when known particulate materials, such as various carbon blacks, are dispersed into a polyurethane foam system, the resulting material typically has an uneven distribution within the foam. More particularly, the carbon black or other particulate material typically is concentrated in the struts of the foam structure. This uneven distribution leads to higher thermal conductivities than is desirable. In accordance with certain preferred embodiments, chemically modified carbonaceous fillers are used in addition to or in place of some or all such prior known filler materials. More specifically, chemically modified carbonaceous fillers comprising surface modified carbon black, most preferably carbon blacks which have been chemically treated to provide one or more organic groups or polymeric moieties having organic groups, such as esters or alkyls, impart a beneficial character to the particles yielding improved dispersion in an isocyanate portion of a polyurethane foam system. Chemically modified carbonaceous fillers comprising carbon blacks which have been chemically treated to attach one or more polar functional groups or polymer moieties having polar functional groups, such as alcohols, amines and the like, have improved dispersion in a polyol portion of a polyurethane system. Moreover, those chemically modified carbonaceous fillers having alcohol or amine groups will be reactive with an isocyanate portion of the polyurethane system.

In accordance with certain especially preferred embodiments, additional improvement in dispersion and thermal conductivity (that is, better dispersion and lower thermal conductivity) are achieved by combining the aforesaid chemically modified carbonaceous filler materials with surfactants, such as for example, silicone/ethylene oxide or silicone/propylene oxide copolymers.

In accordance with another aspect, polymer reactant materials incorporating chemically modified carbonaceous filler are provided, which are suitable for manufacture of the above disclosed polymer foam products.

Especially significant in the field of thermal insulation, the present invention provides filled polymer foams having improved thermal performance characteristics. More particularly, polymer foams incorporating modified carbon black particulate fillers in accordance at least certain preferred embodiments of the present invention are found to provide improved thermal performance when compared to otherwise comparable foams incorporating a like weight percent carbon black or filler having substantially the same particle size and structure.

Preferred polymer foams include polyurethane foams, polyisocyanurate foams, polystyrene, and the like. Preferably, the polymer foams are rigid, closed cell foams having an amount of the chemically modified carbonaceous materials of the present invention. The chemically modified carbonaceous materials of the present invention are believe to be, when incorporated into rigid closed-cell polymer foams in accordance with preferred embodiments, found in higher concentrations in the windows of the foam cells than is achieved using the same polymer system with conventional filler materials. In particular, more of the chemically modified carbonaceous material can be found at the gas/solid interface in the polymer foam. This improved distribution of the filler material results in preferably a lower thermal conductivity of the foam in comparison to the same foam containing conventional filler material. The use of the chemically modified carbonaceous materials of the present invention in polymer foams can further lead to improved infrared radiation absorption, better dispensability, and/or improved thermal insulation of the foam. Thus, the chemically modified carbonaceous materials of the present invention preferably lead to a resulting material which has a distribution of the chemically modified carbonaceous material throughout the foam which leads to a lower thermal conductivity than conventional filler materials using similar amounts.

Various embodiments will be suitable, for example, as insulation material for housing or other architectural applications, as thermal and sound insulation for household and industrial appliances, for example, refrigeration units and the like. It will be within the ability of these skilled in the art to formulate the polymer foam to suit the particular intended applications. In particular, it will be within the ability of those skilled in the art, given the benefit of this disclosure to formulate polymer foams comprising chemically modified carbonaceous materials, optionally along with additives such as any of these which are well-known for use in insulative polymer foams. Without wishing to be bound by theory, it is believed that conventional fillers in prior filled polymer foams were preferentially located in the "struts" portion of the individual cells of the foam, rather than in the "windows" of the cells. It is believed that the foaming process in which polymer material is thinned to form the windows, causes conventional filler materials to move from the window area into the struts area. In accordance with certain preferred embodiments of the invention, chemically modified carbonaceous materials are employed which preferentially locate in the windows portion of the foam cells, rather than in the struts. Thus, in comparison to the use of, for example, carbon black particles of substantially the same particle size and structure, the use of the chemically modified carbonaceous materials of the present invention results in a higher particle density in the window portions of the polymer cell foam than would be achieved using conventional carbon black particulate filler. In preferred embodiments, the chemically modified carbonaceous materials achieve particle density in the windows portion of the foam cells equal to that found in the struts portion of the foam cells. In certain highly preferred embodiments, the particle distribution in the cell windows is even higher than that in the struts portion of the foam cells. The polymer materials suitable for use in the foams of the present invention include those currently known for insulative foam application. Preferred polymer foams include polyurethane foams, polyisocyanurate foams and polystyrene foams. In certain preferred embodiments, such polymer foams are formed without chlorofluorocarbons (CFCs) and hydrochlorofluoro carbons (HCFCs). Rather, these preferred embodiments employ as blowing agents certain hydrocarbons, such as pentane and isopentane. Thermal conductivity of polymer foams, such as polyurethane foams, formed using such hydrocarbon blowing agents typically have higher thermal conductivity than corresponding forms formed with CFCs or HCFCs. The hydrocarbon blowing agents, however, are believed to be environmentally advantageous over CFCs and HCFCs. In accordance with certain preferred embodiments of the present invention, the higher thermal conductivity of polymer foams formed with hydrocarbon blowing agents is reduced through the use of chemically modified carbonaceous filler or chemically modified carbonaceous materials of the present invention.

The preferential locating of the chemically modified carbonaceous materials or fillers in the windows of the foam cells provides an additional benefit. Specifically, chemically modified carbonaceous materials or fillers located in the foam cell windows are found to be more effective at reducing radioactive thermal losses, through it action as an infra-red (IR) absorber. Because the thermal conductivity of particulate filler typically is substantially higher than thermal conductivity of the polymer material, reducing the amount of particulate filler can reduce the thermal conductivity of the foam. Hence, by using chemically modified carbonaceous materials of the present invention which locate preferentially in the windows of the foam cells, as desired reduction in radioactive loss can be accomplished with less particulate filler thereby achieving also the desired reduction in solid-phase conductivity. In accordance with preferred embodiments, chemically modified carbonaceous materials are used in the polymer foams of the present invention in an amount less than about six percent (6%) by weight of the foam (that is, a per unit weight of the total foam composition). More preferably, the chemically modified carbonaceous materials of the present invention are used in an amount less than about four weight percent (4 wt %), for example, from about one percent to about four percent (1% to 4%).

In accordance with certain preferred embodiments, a method of insulating a structure is provided, especially a method of providing thermal and sound insulation. A layer, for example, a sheet or block, of closed cell polymer foam in accordance with the foregoing disclosure, is employed as at least one component of a wall of a structure. Preferably a rigid polymer foam panel, optionally an extruded insulative polymer foam structure, is applied to a wall of the structure to be insulated. In this regard, the present invention is an improvement over the disclosure of U.S. Pat. No. 5,373,026 to Bartz et al, the entire disclosure of which is hereby incorporated by reference.

Similarly, the present invention is an improvement over the disclosure of U.S. Pat. No. 5,604,265 to DeVos et al regarding the preparation of fine-celled, closed-celled, rigid polyurethane or urethane-modified polyisocyanate foam. The entire disclosure of the DeVos et al. patent in hereby incorporated by reference for its teaching of the preparation and use of fine-celled, closed-celled rigid foams. It will be within the ability of those skilled in the art, given the benefit of the disclosure herein of the present invention, to make and use polymer foam products incorporating chemically modified carbonaceous materials of the present invention in lieu of the carbon black fillers suggested in the DeVos et al. patent. In accordance with certain preferred embodiments, polymer foam of the invention is made by mixing together two or more reactive polymer components, for example, a polyisocyanate component and a polyol component. The chemically modified carbonaceous materials of the present invention can be dispersed into one or more such reactive components prior to mixing the reactive components as they are mixed together. Alternatively, the chemically modified carbonaceous materials of the present invention can be dispersed into the reactive components as they are mixed together. Preferably, the polymer foams have at least about 87% closed cells, more preferably at least about 91% closed cells. In accordance with certain preferred embodiments, rigid, closed-cell, polyurethane foam comprising chemically modified carbonaceous materials disclosed herein has cell windows which are about 0.5 microns in thickness. Especially preferred embodiments of this type employ chemically modified carbonaceous materials with surface bonded polymer moieties having an amine or alcohol functional group to provide reactivity or affinity to a polyol or isocyanate reactive component of such polyurethane foam. The polyurethane foam is formed by achieving excellent initial dispersion of the chemically modified carbonaceous material of the present invention into the appropriate reactive component of the foam.

In accordance with certain preferred embodiments, closed-cell, rigid polymer foam comprises chemically modified carbonaceous materials of the present invention carrying low surface energy groups attached to the surface of the chemically modified carbonaceous materials. Without wishing to be bound by theory, it is presently understood that the low surface energy groups at the surface of the chemically modified carbonaceous materials of the present invention changes their wetting characteristics. These changes in surface energy are believed to drive the filler particles toward the gas/solid interface found primarily at the windows of the foam cells. In accordance with certain especially preferred embodiments, the chemically modified carbonaceous materials of the present invention bears alkyl, such as C1 to C20 groups, e.g. C1 to C8 groups, or halogenated alkyl groups, especially fluorinated alkyl groups, polyalkylene oxides, or polysiloxanes. Surface treatment of chemically modified carbonaceous materials used in foams disclosed here, in accordance with certain preferred embodiments, is preferably from about 1 to about 5 $\mu$lmol/m2.

In accordance with preferred embodiments, the polymer reactant is selected from: fluoropolymer alkylene oxide polymer or polyether, most preferably fluoropropylene oxide polymers, having number average molecular weight of about 200 to 20,000, more preferably about 500 to 5000, for example, about 1000; alkylene oxide polymers or polyethers, most preferably propylene oxide polymers, having number average molecular weight of about 200 to 20,000, more preferably about 500 to 5000, for example, about 1300; and siloxanes having number average molecular weight of about 200 to 20,000, more preferably 500 to 5000, for example, about 1300. The reactive functionality of the polymer reactant is selected to yield the chemically bonded reaction product as discussed above. Exemplary silicone surface modifying materials for chemically modified carbonaceous materials suitable for the filled foam materials disclosed here include, for example, polydimethylsiloxanes, other organic siloxanes and block copolymers that contain other materials, such as alkylene oxides, for example.

In especially preferred embodiments, a closed-cell, rigid polymer foam incorporating the chemically modified carbonaceous materials of the present invention has thermal conductivity at least one percent (1%) and in certain especially preferred embodiments five percent (5%) or even ten percent (10%) better (i.e., lower) than a corresponding polymer foam without filler. It also has better thermal insulating value than a corresponding polymer foam employing a corresponding conventional carbon black in like amount as the chemically modified carbonaceous materials of the present invention.

In accordance with certain preferred embodiments, rigid, closed-cell, polyurethane foam comprising chemically modified carbonaceous materials has cell windows which are about 0.5 microns in thickness. In accordance with certain preferred embodiments, rigid, closed-cell foam, e.g. polyurethane foams, are provided with cell sizes less than 200 microns, preferably about 150 to about 200 microns. Chemically modified carbonaceous materials disclosed herein which are suitable for such preferred embodiments include, for example, those capable of generating gas to nucleate cell formation during foam manufacture, especially those bearing surface functionality capable of generating gas at elevated temperatures. Especially preferred embodiments of this type include polyurethane foams incorporating chemically modified carbonaceous materials treated with t-butylcarbonates or acylazides or the like. In accordance with certain alternative embodiments, the chemically modified carbonaceous materials carry a substance or surface coating which decomposes at elevated temperatures to generate gas. In accordance with yet other preferred embodiments of this type, rigid closed-cell polyurethane foams comprise chemically modified carbonaceous materials which are highly porous. Without wishing to be bound by theory, it is presently understood that such chemically modified carbonaceous materials trap gas which is released during the foam manufacturing process to nucleate foam cell formation.

In certain preferred embodiments of the present invention, the modified carbonaceous particulate filler is prepared by chemically modifying the surface of a carbonaceous particulate material, as now further discussed. In especially preferred embodiments, a closed-cell, rigid polymer foam incorporating such chemically modified material as the modified carbonaceous particulate filler has thermal conductivity at least one percent (1%) and in certain especially preferred embodiments five percent (5%) or even ten percent (10%) better (i.e., lower) than a corresponding polymer foam without filler. It also has better thermal insulating value than a corresponding polymer foam employing a corresponding unmodified carbon black in like amount as the modified carbon black particulate filler.

Especially preferred embodiments of this type employ modified carbonaceous particulate filler formed by chemically modifying carbon black to provide an amine or alcohol functional group to the surface of carbon black particulate material to provide reactivity or affinity to a polyol or isocyanate reactive component of such polyurethane foam. Thus, the polyurethane foam is formed by achieving excellent initial dispersion of the modified carbon black particulate filler into the appropriate reactive component of the foam.

Exemplary modified carbon blacks of this type include chemically modified porous blacks, such as chemically modified BP2000™ carbon black, which is commercially available from Cabot Corporation.

As indicated above, certain modified carbon black particulate fillers suitable for use in the present invention can be formed by chemically treating carbon black particulate materials. Surface treatment of about 1 to 4 $\mu$mol/m$^2$ is preferred, with 4 $\mu$mol/m$^2$ being especially preferred in most cases, since this is presently understood to provide approximately full surface coverage of a typical carbon black material. In the following examples 1–13, exemplary rigid, closed-cell, polyurethane foams are formed in accordance with preferred embodiments of the invention The following polyurethane foam components are used in typical rigid polyurethane foams of the present invention:

1. Polyol or polyol blend with an average functionality of from 3 to 8 and with mean molecular weights of from about 150 to 1,600, and hydroxyl values (mg KOH/g) of 250 to 1,000. Polyols may be, for example polyether, modified polyether, or polyester polyols.
2. Polymeric MDI with an NCO value (%NCO by weight) of from 27 to 31, average functionality of 2.7 to 3.0, and viscosity of from 230 to 2700 mPa at 25° C.
3. Catalysts, such as tertiary amine (e.g., diaminobicyclooctane) or organometallic catalysts (e.g., dibutyltin dilaurate).

4. A surfactant, such as organosiloxanes or silicone-based surfactants, for example, polydimethylsiloxane-polyether graft copolymer surfactants.
5. Blowing agents such as CFC's, HCFCs, FC's, hydrocarbons, water, etc.
6. Optionally flame retardants.

An exemplary rigid polyurethane foam formulation suitable for filled polymer foam products of the present invention is prepared by blending components together in the proportions listed below.

| Component | Parts |
| --- | --- |
| Polyol (hydroxyl number of 750) | 100 |
| PMDI (NCO value of 31) | 182 |
| Surfactant | 0.1 to 5 |
| Amine Catalyst | 0.1 to 3 |
| Cyclopentane | 5 to 20 |
| Water | 0.1 to 5 |

Chemically modified carbonaceous filler as disclosed above can be added to the component list to prepare a foam with improved (i.e., lower) thermal conductivity. The chemically modified carbonaceous filler can be dispersed into either of the polymer reactants, i.e., into the polyol or into the isocyanate at any suitable loading level, e.g., a 6–12% loading, using any suitable mixing apparatus, e.g., a Silverson L4R high speed rotor/stator mixer. For example, a filler/isocyanate dispersion is mixed for 30 minutes using the high sheer head at maximum speed.

In certain preferred embodiments of the present invention, the chemically modified carbonaceous filler is prepared by chemically modifying the surface of a carbonaceous particulate material. Surface treatment of about 1 to 5 $\mu$mol/m$^2$ is preferred, with 4 $\mu$mol/m$^2$ being especially preferred in most cases, since this is presently understood to provide approximately full surface coverage of a typical carbonaceous material. The polymer moieties attached to the carbonaceous particles in such embodiments result, in certain preferred embodiments, from reaction of a suitably functionalized polymer reactant with suitably functionalized carbonaceous particles. Polymer reactants which can be functionalized for reaction with the carbonaceous particles include, for example, polyethylene, poly(vinylchloride), polyisobutylene, polycaprolactam (nylon), polyisoprene, polyamides, polycarbonates, polyelectrolytes, polyesters, polyethers, polyalkylene oxides, (polyhydroxy)benzenes, polyimides, polymers containing sulfur, polyolefins, polyols, polymethylbenzenes, polystyrene, styrene copolymers, acetal polymers, acrylic polymers, acrylonitrile polymers and copolymers, polyolefins containing halogen, fluoropolymers, ionomeric polymers, polysaccharides, polymers containing ketone group(s), liquid crystal polymers, polyamide-imides, polymers containing olefinic double bond(s), polyolefin copolymers, polyphenylene oxides, polyurethanes, thermoplastic elastomers, silicone polymers, alkyd, epoxy, and unsaturated polyester.

In accordance with certain embodiments, the polymer reactant is selected from polyalkylene oxides wherein the alkylene moiety is a C2 to C4 moiety, most preferably being polyethylene oxide or polypropylene oxide or copolymers of alkylene oxides such as copolymers of ethylene glycol and propylene glycol. In certain embodiments employing such polymer modification of carbonaceous materials, preferably the low structure, medium sized carbon blacks known for use as fillers in coatings and plastics, such as MONARCH® 700, for polyurethane foams prepared as the reaction product of polyol and isocyanate reactants, 3% to 5% or more increased thermal insulation values have been achieved.

Such polyethylene oxides and polypropylene oxides, being referred to alternatively as polyethylene glycols and polypropylene glycols, preferably have a weight average molecular weight of about 200 to 10.000 for good balance of reactivity with the carbonaceous particulate material, good dispersability of the resultant surface-treated filler in the polymer foam, and good reduction of thermal conductivity. More preferably, the weight average molecular weight is about 300 to 5,000, most preferably about 500 to 3,000.

The polyalkylene oxides preferably are covalently or ionically bonded to the carbonaceous particulate material. The diazonium reaction procedure discussed below is suitable for attaching polyalkylene oxides to carbon black and other carbonaceous particulate materials. Preferably, the carbonaceous particulate material is treated with polyalkylene oxides to a treatment level of about 0.01 mmol/gram to 3.0 mmol/gram, more preferably 0.03 to 2.0 mmol/gram, most preferably about 0.05 to 1.0 mmol/gram. Specifically, for example, poly(ethylene glycol) methyl ether (CAS No. 9004-74-4,) $M_n$ 750, and poly(propylene glycol) monobutyl ether (CAS No. 9003-13-8,) $M_n$ 1000, both commercially available from Aldrich Chemical Co., and copolymers, e.g., copolymers of ethylene glycol and propylene glycol (CAS No. 9003-11-6) can be used for surface treating carbon blacks and other carbonaceous particulate materials via such diazonium reaction method. In one example of such method, the end-capped polyethylene glycol mentioned above (CAS No. 9004-74-4) is reacted with nitrophenyl isocyanate. The nitro phenyl group of the reaction product is then reduced to aniline, i.e., amine functionalized phenyl group, via hydrogenation with palladium catalyst and hydrogen gas. The reaction product is then attached to carbon black, which need not be pre-treated or pre-functionalized, via the diazonium reaction employing 2 stoichiometric acid, such as nitric acid, and 1 stoichiometric sodium nitrate to convert the aniline group to the corresponding diazonium salt. The diazonium salt optionally can be formed in the presence of the carbon black, and attaches to the surface of the carbon black.

In accordance with certain preferred embodiments, carbonaceous material is surface modified to chemically bond silicone moieties. In certain such embodiments the surface of the carbonaceous material is first modified via a diazonium reaction that attaches negatively charged groups to the surface of carbonaceous material (e.g. that of sulfanilic acid, for the attachment of benzosulfonate groups.) The surface of the carbonaceous material is then further treated with positively charged amino-silicone compounds that will attach with the negatively charged ionic groups present at the surface of the carbonaceous material, and attach themselves to the carbonaceous material. The aminosilicone groups can consist of either oligomeric silicones (e.g. 4-aminobutyldimethylmethoxysilane—$C_7H_{19}NOSi$) or polymeric silicones (e.g. Polydimethyl-siloxane, aminopropyidimethyl terminated—$NH_2CH_2CH_2CH_2O[(CH_3)_2SiO]_yCH_2CH_2CH_2NH_2$), or copolymers having pendant amine groups. The treatment groups can also have single or double amine functionality. The amines can be primary, secondary, or tertiary (in which case, preferably, they are protonated to react) or quaternary salts (in which case they are inherently positively charged) that can be prepared by alkylation of the previous categories of amines.

These new surface modified carbonaceous material can have a desired silicon content based on the selected treatment level. By modifying the surface of carbonaceous material using this two-stage treatment procedure, the silicon-containing carbonaceous material, in certain preferred embodiments, especially in polyurethane frames, will be found in higher concentrations at the cell faces of the foam than will conventional grades of carbon black. That is, the treated carbonaceous material particles will have surfactant properties and preferentially migrate to the gas/liquid surface of the polyurethane as it foams, thus locating in the windows and improving the thermal insulation value of the polyurethane foam.

In alternative preferred embodiments, the surface modification is of carbon black or other chemically modified carbonaceous filler with silicon-based functional groups is accomplished through the attachment of the oligomeric or polymeric silicones or siloxanes. Exemplary silicone surface modifying materials include, for example, polydimethylsiloxanes, other organic siloxanes and block copolymers that contain other materials, such as alkylene oxides, for example. Again, the surface modified particles can have a desired silicon content based on the selected treatment level.

In accordance with certain preferred embodiments, carbon black or other carbonaceous filler is surface modified to chemically bond poyalkylene oxide moieties. In certain such embodiments the surface of the carbonaceous filler is first modified via the diazonium reaction that attaches negatively charged groups to the surface of carbonaceous filler (e.g. sulfanilic acid for the attachment of benzolufonate groups. The surface of the carbonaceous filler is then further treated with polyalkylene oxide polymers containing positively charged groups (e.g., p-alpha-aminoethylphenol propoxylate-N30) that will attach with the negatively charged groups present at the surface of the carbonaceous filler and attach themselves to the carbonaceous filler. The carbonaceous filler may also be modified via diazonium reaction that attaches positively charged groups to the surface of carbonaceous filler (e.g., 3-aminopyridime for the attachment of a pyridinium group). The surface of the carbonaceous filler can then be further treated with a polyalkylene oxide polymers containing negatively charged groups to attach with the positively charged group present at the surface of the carbonaceous material.

By modifying the surface of carbonaceous material using this two-stage treatment procedure, tile attachment group will allow for better dispersion in the foam making components (e.g. PMDI or Polyol) and will also allow for higher concentrations of carbon black at the cell faces of the foam compared to prior known fillers. That is, the treated carbonaceous material particles will have surfactant properties and preferentially migrate to the gas/liquid surface of the polyurethane as it foams, thus locating in the cell windows and improving the thermal insulation value of the polyurethane/polyisocyanurate foam. In alternative preferred embodiments, carbon black or other carbonaceous filler is chemically modified by attachment of polymeric alkylene oxide groups to the carbon black.

In accordance with certain preferred embodiments, carbon black or other carbonaceous filler is surface modified by chemically bonding fluorinated polymer moieties to the particles. Improved dispersability, thermal insulation and flame retardance, in polyurethane or polyisocyanurate foams especially, is obtained. Suitable fluorinated polymers for use as reactants include fluorinated surfactants.

Preferred fluorinated materials contain as part of their structures a straight chain of difluoromethylene, diflouromethylene oxide, fluoroethylene oxide, or hexafluoropropylene oxide monomer, as well as short or long chain hydrocarbon and/or polyether segments. The fluorinated materials will be attached to the surface of the carbonaceous material. For preferred attachment through ionic bonding the fluoropolymer preferably has a charged moiety, either positive or negative, in its molecular structure. The carbon black or other carbonaceous particle is surface treated to have oppositely charged moieties. For preferred covalent attachment the fluoro-compound has, or is modified to possess a functional group that will allow for covalent bonding to the surface of the carbonaceous material. Again, the filler particle is surface treated to have functional groups reactive with the functional groups of the fluoro-compound.

In the case of directly attached fluorinated polymers the carbon black or other carbonaceous filler to be modified need to have any special characteristics. In other cases, the surface of the carbon black or other carbonaceous filler preferably has already undergone treatment leaving it with a relatively stable and uniform charge. These surface functionalized material may be dispersed in either the polyol or isocyanate side of the foam system.

These carbon black or other carbonaceous filler materials, when incorporated into rigid closed cell polyurethane foams, for example, will be found in higher concentrations at the cell faces of the foam than will conventional grades of carbon black. That is, more of the carbon black will be found at the gas/solid interface in the polyurethane foams containing the modified carbon materials. Moreover, this improved distribution of the modified carbonaceous material will, in certain preferred embodiments, result in lower thermal conductivity of the polyurethane foam in comparison to polyurethane foam containing conventional carbon black. In addition, the high amounts of fluorine present in the final foam formulation serve to increase the flame retardance of the foam material.

In accordance with certain preferred embodiments, graphite, including, for example, modified synthetic graphite is employed. The chemical modification of the surface chemistry of the graphite, as disclosed here, provides treated graphites whose performance is superior to the corresponding untreated material. Specifically, the incorporation of such treated graphites yields insulating polymer foam materials with reduced thermal conductivity, or enhanced insulting performance, when compared to corresponding materials formed by incorporating the corresponding un-modified graphites. In a preferred method for preparing the chemically modified graphite, surface modification yields treated graphite material that exhibits superior dispersion in the foam when compared to the use of an un-modified graphite. Surface modification can also yield a higher concentration of graphite material in the cell faces or windows than results when using an un-modified graphite.

Methods for modifying the surface chemistry of graphite include chemically bonding materials to the surface by covalent or ionic bonds, preferably through surface treatment chemistry herein discussed with reference to carbon black and other filler materials.

Various types of materials may be used to modify the surface of graphite. Examples include, but are not limited to: alkylene oxides, siloxanes, poly(acrylic acid) and derivatives such as poly(amides), poly(vinyl alcohols), fatty acids, ethoxylated fatty acids, and fatty acid esters, saturated and unsaturated hydrocarbons, fluorinated or perfluorinated chains, and copolymers comprising combinations of any of the above.

The above materials may contain or be terminated by primary, secondary, tertiary, or quaternary amines, and are thus capable of having as part of their structure a stable cation. The above materials may contain or be terminated by negatively charged moieties such as sulfates, phosphates, and carboxylates and are thus capable of having as part of their structure a stable anion. The above materials may also contain or be terminated by a primary aryl amine. The presence of an aryl amine moiety enables covalent attachment via the generation of the corresponding diazonium salt of the amine, such as described in U.S. Pat. No. 5,553,739, the entire disclosure of which is incorporated herein by reference. This same process is also useful for covalently attaching molecules containing as part of their structures stabilized charges. For example the attachment of a negatively charged benzene sulfonate group results form a diazonium treatment with sulfanilic acid, Likewise, molecules with positive charges may be similarly attached. The resulting graphite product with charged molecules on the surface may then be subsequently treated with material containing a moiety of opposite charge, such as those listed above, yielding an ionic bond attachment between the premodified graphite and the material of interest.

Suitable reactants and methods for preparing the chemically modified carbonaceous filler, including, for example, suitable reactants and methods for functionalizing carbonaceous filler particles and correspondingly functionalizing and, in some cases, the polymer reactants, are taught in the following documents, each of which is hereby incorporated herein by reference in its entirety: International Application Number PCT/US97/08855 as WO 97/47691; U.S. patent application Ser. Nos. 08/990,715; 09/210,370; 60/104,117; 08/968,299; 08/962,244; 08/899,263; and 09/089,363, and International Application No. PCT/US98/02518 published as WO 98/34960.

The chemically modified carbonaceous materials of this invention may also be used in the same applications as conventional pigments, like carbon blacks. The groups attached to the chemically modified carbonaceous materials, however, can be used to modify and improve the properties of a given pigment for a particular use.

Chemically modified carbonaceous materials according to the invention can be used in a number of end use applications. These uses include, for example, plastic compositions, aqueous and non-aqueous inks, aqueous and non-aqueous coatings, rubber compositions, toner compositions, paper products, and textile and fiber compositions. The following paragraphs describe these uses generally and examples of each are shown below.

The chemically modified carbonaceous materials of this invention can be used as colorants in a plastic material. The chemically modified carbonaceous materials of the invention can also be used to impart conductivity to a plastic material. The modified pigment products of the invention may give an increased rate of dispersion or improved quality of dispersion over the corresponding untreated pigment. These improvements offer an economic advantage in plastic manufacture and in value of the finished product, respectively. Using the chemically modified carbonaceous materials of the invention may improve impact strength of the plastic. Thus, the invention relates to an improved plastic composition comprising a plastic and the chemically modified carbonaceous materials of the present invention.

As with conventional pigments, the chemically modified carbonaceous materials of the invention can be used with a variety of plastics, including but not limited to plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) the aminos (melamine and urea); (4) epoxies; (5) phenolics; (6) polyesters; (7) silicones; and (8) urethanes.

Generally, the chemically modified carbonaceous material of the invention is added like any other pigment to the plastic used to form a plastic premix. This can be done, for example, in a dry mix or a melt stage. The chemically modified carbonaceous materials may also be incorporated on or in a plastic by adding it to a solvent, where the plastic is soluble or partially-soluble, followed by removal of the solvent (e.g., by evaporation). The chemically modified carbonaceous materials of the invention may be used in combination with other conventional additives in plastic compositions. According to the invention, the term plastic composition includes, but is not limited to, any plastic material, article, goods, surface, fabric, sheet, film, and the like. For example, plastic materials include automotive parts, siding for homes, liners for swimming pools, roofing materials, packaging materials, synthetic fibers, food, and storage containers, light absorbing applications (e.g., bar codes), and any variety of other household or industrial items.

The chemically modified carbonaceous materials of this invention are also useful in aqueous and non-aqueous ink formulations. Thus, the invention provides an ink composition comprising an ink vehicle and chemically modified carbonaceous materials. Other known ink additives may be incorporated into the ink formulation. Typical inks include, but are not limited to: lithographic, letterpress, flexographic, gravure, screening, phase change ink jet inks, and ink jet applications.

In general, an ink consists of four basic components: (1) a colorant, (2) a vehicle or varnish which functions as a carrier during printing, (3) additives to improve printability, drying, and the like, and (4) solvents to adjust viscosity, drying and the compatibility of the other ink components. For a general discussion of the properties, preparation and uses of inks, see The Printing Manual, 5th Ed., Leach et al, Eds. (Chapman and Hall, 1993) incorporated herein by reference. Various ink compositions are also disclosed, for example, in U.S. Pat. Nos. 2,833,736; 3,607,813; 4,104,833; 4,770,706; and 5,026,755, incorporated in their entirety herein by reference.

The chemically modified carbonaceous materials of the invention, either as predispersion or as a solid, can be incorporated into an ink formulation using standard techniques. Use of a water dispersible or solvent-dispersible chemically modified carbonaceous materials of the invention can provide a significant advantage and cost savings by reducing or eliminating the milling steps generally used with other conventional pigments.

Flexographic inks represent a group of ink compositions. Flexographic inks generally include a colorant, a binder, and a solvent. The chemically modified carbonaceous materials of the invention are useful as flexographic ink colorants.

The chemically modified carbonaceous materials of the invention can be used in news inks. For example, a news ink composition may comprise an ink vehicle (e.g., water), the chemically modified carbonaceous materials of the invention, a resin, and optional conventional additives such as antifoam additives or a surfactant.

The chemically modified carbonaceous materials of the invention may also be used in phase change (hot melt) inks. Phase change inks generally include at least one colorant and at least one phase change or wax carrier (e.g., a fatty amide-containing material like a mixture of a tetra amide compound and a mono-amide compound, or an alkanolamides and polyethylene glycol mixture). The phase change ink is in a solid phase at ambient temperature and in a liquid phase at an elevated operating temperature of the printer. When the ink is heated it melts to form a low viscosity fluid that can be ejected as droplets. Upon jetting, heated droplets impact on a substrate, and cool to ambient temperature forming films of uniform thickness. Subsequent impaction of the droplets on the substrate may also occur, depending upon the type of printer used. Use of chemically modified carbonaceous materials can provide a significant advantage in dispersion stability and carrier compatibility over conventional pigments and in light-fastness over dyes.

The chemically modified carbonaceous materials of the present invention can also be used in lithographic or flexographic printing. For example, the ink or fountain solution used in the printing process can contain the chemically modified carbonaceous materials of the present invention.

The chemically modified carbonaceous materials of the present invention can also be used in the manufacture of lithographic printing plates, such as infrared or near-infrared laser-imageable printing plates. Typically, imaging occurs when the plate is exposed to radiation having wavelengths of between 800 and 1100 nm. Generally, an infrared or near-infrared laser-imageable lithographic printing plate includes at least the following layers: a grained-metal or polyester plate or sheet-like substrate and a radiation-absorptive layer coated thereon. Protective layers for the substrate or the surface of the coated plate may also be used in the present invention. When coated onto the substrate, the protective layer can also serve as an adhesion-promoting primer. Other layers may be used, for example, to improve adhesion between layers and durability of the printing plate. The radiation-absorptive layer contains the modified pigment of the present invention along with other conventional ingredients, such as resins and binders. In the imaging process, a lithographic printing plate is selectively exposed to a laser output or other source capable of removing or chemically modifying the radiation-absorbent layer or layers adjacent thereto. The laser output will define a pattern on the printing plate and remove or modify only those portions of the radiation-absorptive layer which define the pattern. Afterwards, the printing plate can be further developed by subjecting it to a solvent capable of removing the imaged layer(s), if any remains, which defines the same pattern. The details of the various conventional components and techniques for such printing plates are described in U.S. Pat. No. 5,493,971; EP 0 803 771 A1; EP 0 770 494 A2; EP 0 770495 A1; as well as PCT Publication WO 98/31550 and the patents and publications referenced therein, all of which are incorporated in their entirety by reference herein.

The chemically modified carbonaceous materials of the invention may also be used in coating compositions such as paints or finishes, or the like. Thus, an embodiment of the invention is a coating composition comprising an aqueous or non-aqueous vehicle, resin or binder, and an chemically modified carbonaceous material. Other known coating additives may be incorporated in the coating compositions. See, for examples, McGraw-Hill *Encyclopedia of Science & Technology*, 5th Ed. (McGraw-Hill, 1982), incorporated herein by reference. See also U.S. Pat. Nos. 5,051,464; 5,319,044; 5,204,404; 5,051,464; 4,692,481; 5,356,973; 5,314,945; 5,266,406; and 5,266,361, incorporated in their entirety by reference herein.

The chemically modified carbonaceous materials of the invention, either as a predispersion or as a solid, can be incorporated into a coating composition using standard techniques. Use of a water or solvent dispersible chemically modified carbonaceous materials of the invention provide a significant advantage and cost savings by reducing or eliminating the milling steps generally used with other conventional pigments.

The chemically modified carbonaceous materials of the invention may also be used in paper compositions. Accordingly, the invention relates to a paper product comprising paper pulp and at least one type of the chemically modified carbonaceous materials of the invention.

The chemically modified carbonaceous materials of the invention, either as a solid or a predispersion, can be incorporated into paper pulp using standard papermaking techniques as with conventional pigments. Use of a water or solvent dispersible chemically modified carbonaceous materials discussed above may provide a significant advantage and cost savings by reducing or eliminating the steps generally used to disperse other conventional pigments.

The paper products of the invention may incorporate other known paper additives such as sizing agents, retention aids, fixatives, fillers, defoamers, deflocculating agents, and the like. Advantageously, the water or solvent dispersible chemically modified carbonaceous materials discussed above are retained more efficiently at low loading levels when compared to the untreated pigments when retention aids and acidic or alkaline sizing agents are used.

The chemically modified carbonaceous materials of the invention may also be used, as with conventional pigments, as pigments, fillers, and reinforcing agents in the compounding and preparation of rubber compositions. Accordingly, the invention relates to a rubber or elastomeric composition containing at least one rubber or elastomer and the chemically modified carbonaceous materials of the invention.

Carbon blacks, for example, are useful in the preparation of rubber vulcanizates such as those in tires. It is generally desirable in the production of tires to utilize carbon blacks which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial unreformed states. Tires with lower hysteresis values reduce rolling resistance and therefore are able to reduce the fuel consumption of the vehicle utilizing the tire. Thus, it is particularly desirable to have carbon black products capable of imparting greater abrasion resistance and lower hysteresis in tires.

The chemically modified carbonaceous materials of this invention are useful in both natural and synthetic rubber compositions or mixtures of natural and synthetic rubbers. The chemically modified carbonaceous materials of the invention can be used in rubber compositions which are sulfur-cured or peroxide-cured.

The chemically modified carbonaceous materials may be mixed with natural or synthetic rubbers by normal means, for examples by milling. Generally, amounts of the chemically modified carbonaceous materials of the present invention range from about 10 to about 250 parts by weight can be used for each 100 parts by weight of rubber in order to impart a significant degree of reinforcement. It is, however, preferred to use amounts varying from about 20 to about 100 parts by weight of chemically modified carbonaceous material per 100 parts by weight of rubber and especially preferred is the utilization of from about 40 to about 80 parts of chemically modified carbonaceous material per 100 parts of rubber.

Rubbers suitable for use with the present invention are natural rubber and its derivatives such as chlorinated rubber. The chemically modified carbonaceous materials of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber composition of the present invention can therefore contain at least one elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

Advantageously, the chemically modified carbonaceous materials of the present invention can impart improved abrasion resistance and/or reduced hysteresis to rubber or elastomeric compositions containing them.

The chemically modified carbonaceous materials of this invention may also be used to color fibers or textiles. Accordingly, the invention relates to fiber and textile compositions comprising a fiber or textile and chemically modified carbonaceous materials of the invention. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk, and linen are used.

The chemically modified carbonaceous materials of the present invention may be colored by means known in the art to color fibers and textiles with, for example, direct and acid dyes. Also, the modified pigments can be incorporated into fibers by spinning techniques, such as wet spinning, dry spinning, and melt spun techniques. For a general discussion of coloring with dyes, see Kirk-Othmer *Encyclopedia of Chemical Technology*, Vol. 8 pp 280–350 "Dyes, Application and Evaluation" (John Wiles and Sons, 1979), incorporated herein by reference. Use of a water or solvent dispersible chemically modified carbonaceous materials of the invention discussed above provides a method for coloring these materials with a lightfast colorant.

The present invention also relates to toner compositions comprising toner resin particles and the modified pigment particles of the present invention. Conventional additives as described in U.S. Pat. Nos. 5,278,018; 5,510,221; 5,275,900; 5,571,654; and 5,484,575; and EPO 270-066A1 can be used and these patents are incorporated herein by reference.

The present invention also relates to an inkjet ink composition comprising an aqueous or non-aqueous vehicle and chemically modified carbonaceous materials of the invention. In contrast to conventional pigments, the chemically modified carbonaceous materials of the invention for use in the inkjet ink of the present invention are not difficult to disperse in an aqueous or non-aqueous vehicle. The chemically modified carbonaceous materials do not necessarily require a conventional milling process, nor are additional dispersants necessarily needed to attain usable ink. Preferably, the chemically modified carbonaceous materials only require low shear stirring or mixing to readily disperse the pigment in water or other solvent.

Formation of an inkjet ink containing a vehicle and stably dispersed chemically modified carbonaceous materials as pigment can be preformed with a minimum of components and processing steps when the above chemically modified carbonaceous materials are utilized. Such an ink may be used in any inkjet printer known in the art. Preferably, in inkjet inks of the present invention, the chemically modified carbonaceous materials are present in an amount of less than or equal to 20%–25% by weight of the inkjet ink. It is also within the bounds of the present invention to use an inkjet ink formulation containing a mixture of unmodified pigment with the chemically modified carbonaceous materials of the present invention. Common additives such as those discussed below may be added to the dispersion to further improve the properties of the inkjet ink.

In particular, a humectant may be added to reduce the rate of evaporation of water in the ink to minimize clogging. If the ink begins to dry out, the humectant concentration increases and evaporation decreases further. Humectants may also affect other properties of the ink and prints made therefrom, such as viscosity, pH, surface tension, optical density, and print quality. Preferred humectants include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones.

Biocides such as benzoate or sorbate salts are important in preventing bacterial growth. Bacteria are often larger than ink nozzles and can cause clogging and other problems. Binders attach to the substrate to hold the colorant on the paper. Examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. Drying accelerating agents promote evaporation of the ink once the ink is placed in the paper. These include sodium lauryl sulfate, N,N-diethyl-m-toluamide, cyclohexylpyrrolidinone, and butyl carbitol. Penetrants such as alcohols, sodium lauryl sulfate, esters, and ketones allow the ink to penetrate the surface of the paper. Alcohols may also be used to increase the rate of drying of the liquid ink, and surfactants like detergents and soap reduce the surface tension to allow the ink to spread on the substrate.

Additionally, the chemically modified carbonaceous materials based inkjet inks may incorporate some dye to modify color balance and adjust optical density. Such dyes include food dyes, FD & C dyes, derivatives of phathalocyanine tetrasulfonic acids, including copper phthalocyanine deviates, tetra sodium salts, tetra ammonium salts, tetra potassium salts, tetra lithium salts, and the like.

Polymers or oligomers may be added to inkjet inks based on the chemically modified carbonaceous materials. The images created from such an ink may be water-insoluble upon polymerization or cross-linking of the added polymers or oligomers.

Additionally, in preparing inkjet inks utilizing the chemically modified carbonaceous materials of the present invention, sequential filtration of the inks through filters of descending size or centrifugation or both may be used to obtain a more desirable final product. For instance, filtering first with a 3.0 micron filter and then filtering with a 1.0 micron filter, and so on, as desired. In addition, the size of the chemically modified carbonaceous materials in the inkjet inks is preferably no larger than about 2 microns. More preferably, the size of the chemically modified carbonaceous materials is one micron or less.

Advantageously, the inkjet inks of the invention have excellent stability over time and a wide range of temperatures, have desirable viscosities and surface tensions, and when printer, have good optical density, print clarity, rub resistance, and waterfastness can be obtained when the inkjet ink contains certain stryenated acrylics that impart this property. For instance, one such stryenated acrylic has a molecular weight of about 4200, a polydispersibility of about 2, and acid number of about 215, a softening point of about 128° C., and a Tg of about 67° C. A commercially available example is JONCRYL 58 acrylic (JONCRYL is a registered trademark of Johnson Polymer, Racine Wis.), which is a solution of Joncryl 680.

The chemically modified carbonaceous materials of the present invention can also be used as adsorbents, such as in the manner described in WO 97/47382, which is incorporated in its entirety by reference herein.

Also, the chemically modified carbonaceous materials of the present invention can also be used as a substitute for carbon products, such as carbon black, in such applications as electrodes, such as gas diffusion electrodes and fuel cells, for instance, using the designs described in U.S. Pat. Nos. 5,441,823; 4,927,514; 5,561,000; and 4,877,694, all incorporated in their entireties by reference herein.

It will be apparent from the foregoing, and from the following detailed description of certain preferred embodiments, that the polymer foam of the present invention comprising chemically modified carbonaceous filler will have numerous commercial and industrial applications.

The present invention will be further clarified by the following examples, which are intended to be purely exemplary of the present invention.

EXAMPLES

The following sample preparation method was employed. The modified carbon black particulate filler was dispersed in the isocyanate at a 4% loading using a Silverson L4R high speed rotor/stator mixer. To incorporate the filler, the materials first were mixed for 10 minutes using the low shear head with a speed set at 5, then at maximum speed for five minutes. Next, the dispersion was mixed at 30 minutes using the high shear head with the speed set at maximum.

The amounts of components used were: 1340 grams polyol, 215.03 grams of the filler/isocyanate dispersion and 17.30 grams of cyclopentane along with the surfactants and amine catalysts to give a total weight of 368.04 grams. The components were added to a plastic cup and blended for 6 seconds at 2000 rpms. The blend was then poured rapidly into a 10×10×5 inch box. The procedure to make control foams was the same except that the addition and dispersion of the filler was omitted.

The resulting foam was cut with a band saw and planed to give a foam slice with dimensions of 8×8×1 inch. Thermal conductivity of the foam was measured at 10° C. using a LaserComp FOX300 instrument.

Modified carbon black particulate fillers for use in the examples were formed by chemically modifying various different carbon black particulate materials as listed in Table 2, below. In all cases, the surface modifications were carried out on fluffy carbon black. In examples 1–8 starting particulate materials in each are listed by its commercial name and are available from Cabot Corporation, Boston, Mass., USA. The resulting modified carbon black particulate in each case was preblended into the isocyanate portion of the foam system as described above. Polymer foam was obtained in each case, having good thermal insulation properties and good physical properties, including structural stability and handling ability.

TABLE 2

| Example No. | Surface Treating Agent | Particular Material | Treatment Level ($\mu$mol/m$^2$) |
| --- | --- | --- | --- |
| 1 | sulfanilic acid | Monarch ® 120 | 1 and 4 |
|   |   | Vulcan 7 H | 1 and 4 |
| 2 | 4-aminobenzoic acid | Monarch ® 120 | 1 and 4 |
|   |   | Vulcan 7 H | 1 and 4 |
| 3 | 4-aminophenyl sulfatoethylsulfone | Monarch ® 120 | 1 and 4 |
|   |   | Vulcan 7 H | 1 and 4 |
| 4 | 4-aminosalicylc acid | Monarch ® 120 | 1 and 4 |
|   |   | Vulcan 7 H | 1 and 4 |
| 5 | ethyl-4-aminobenzoate | Monarch ® 120 | 1 and 4 |
|   |   | Vulcan 7 H | 1 and 4 |
| 6 | 4-butylaniline | Monarch ® 120 | 1 and 4 |
|   |   | Vulcan 7 H | 1 and 4 |
| 7 | 3-aminobenzylalcohol | Monarch ® 120 | 1 and 4 |
|   |   | Vulcan 7 H | 1 and 4 |
| 8 | 3-trifluoromethylaniline | Regal ® 330 | 4 |

In examples 9–13 listed below in Table 3, the modified carbon black was formed by surface treatment certain particulate materials, specifically, silica/carbon nultiphase particulate materials, available from Cabot Corporation, Boston, Mass., USA. The weight percent silica in each material is shown in the table. Polymer foam was formed in each case, having good thermal insulation properties and good physical properties, including structural stability and handling ability.

TABLE 3

| Example No. | Surface Treatment | Particulate Material | Treatment Level (pbw) |
|---|---|---|---|
| 9 | PDMS, OH terminated (Mw = 1500–2000) | (15% Si) | 1, 5, 10, 20 |
| 10 | (tridecafluro-1,1,2,2-tetrahydooctyl)triethoxysilane | (15% Si) | 1, 5, 10, 20 |
| 11 | (3,3,3-trifluoropropyl)trimethoxysilane) | (15% Si) | 1, 5, 10, 20 |
| 12 | Methyltrimethoxysilane | (15% Si) | 10, 20 |
| 13 | (3-aminopropyl)triethoxysilane | (15% Si) | 10, 20 |

For each example 1–13, the distribution of the modified carbon black particulate filler in the resultant foam was assessed visually by optical or electron microscopy. For each example a corresponding control sample was formed, employing the same starting particulate as the filler material but without the surface treatment listed in the table. Examples 5 and 6, employing ethyl-4-aminobenzoate and 4-butylaniline, respectively, were especially successful in showing more particulate filler in the windows than was found for the corresponding control sample. Also, example 8 was especially successful in showing appreciable levels of modified carbon black particulate filler in the windows of the foam cells; however, there was no control foam for comparison purposes. Also, example 7 was especially successful in this regard. Without wishing to be bound by theory, it is presently understood that the 3-aminobenzylalcolhol functionality on the surface of the modified carbon black particulate filler was reactive with the isoycyanate groups in the foam formulation. The modified carbon black particulate filler concentration in the windows of the foam cells was somewhat higher than in the corresponding control sample. Examples 9–14 were found to have poor dispersion of the modified carbon black particulate filler into the foam, indicating that improved methods of mixing the particulate filler into the polyol blend or other reactive component of the foam is desirable. The use of a three-roll mill is preferred in some instances to achieve improved mixing. Similarly, a Kady Mill is preferred in some instances, or a like batch mixer generating high shear mixing with interchangeable rotostator heads.

From the foregoing it will be understood that the present invention provides polymer foams comprising modified carbon black particulate filler. In preferred embodiments the filler is preferentially located in the windows of the foam cells.

It will be apparent to those skilled in the art from the foregoing disclosure of the present invention and from the detailed description of certain preferred embodiments, that numerous modifications and alternative embodiments are possible within the true scope and spirit of the invention. The following claims and equivalents thereof are intended to cover the true scope and spirit of the invention.

what is claimed is:

1. An aggregate having attached at least one polymer, wherein said aggregate comprises at least one carbon phase and at least one silicon-containing species phase, wherein said polymer is selected from polyethers, methacrylates, polyvinyl alcohols, polyalkylenes, polyethylene, poly(vinylchloride), polyisobutylene, polycaprolactam (nylon), polyisoprene, polyamides, polycarbonates, polyelectrolytes, polyesters, polyethers, polyalkylene oxides, (polyhydroxy)benzenes, polyimides, polymers containing sulfur, polyolefins, polyols, polymethylbenzenes, polystyrene, styrene copolymers, acetal polymers, acrylic polymers, acrylonitrile polymers and copolymers, polyolefins containing halogen, fluoropolymers, ionomeric polymers, polysaccharides, polymers containing ketone group(s), liquid crystal polymers, polyamide-imides, polymers containing olefinic double bond(s), polyolefin copolymers, polyphenylene oxides, polyurethanes, thermoplastic elastomers, silicone polymers, alkyd, epoxy, and unsaturated polyester or combinations thereof.

2. The aggregate of claim 1, wherein said aggregate, when incorporated into an elastomer, imparts to the elastomer poorer abrasion resistance, comparable or higher loss tangent at low temperature, and a lower loss tangent at high temperature, compared to carbon black.

3. The aggregate of claim 1, wherein said silicon-containing species phase is primarily at the surface of the aggregate.

4. The aggregate of claim 1, wherein said reactive polymer is primarily attached to the silicon-containing species phase of the aggregate.

5. The aggregate of claim 1, wherein said polymer comprises a silane-containing polymer.

6. The aggregate of claim 1, wherein said polymer comprises a siloxane.

7. The aggregate of claim 1, wherein said polymer comprises a polydimethylsiloxane, a tri-ethoxy terminated silane polymer; or a tri-methoxy terminated silane, or combinations thereof.

8. The aggregate of claim 1, wherein more than one type of polymer is attached to the aggregate.

9. The aggregate of claim 1, further comprising the attachment of at least one organic group.

10. The aggregate of claim 9, wherein said organic group comprises at least one aromatic group or at least one alkyl group.

11. An aggregate having attached at least one polymer, wherein said aggregate comprises a carbon black at least partially coated with silica, wherein said polymer is selected from polyethers, methacrylates, polyvinyl alcohols, polyalkylenes, polyethylene, poly(vinylchloride), polyisobutylene, polycaprolactam (nylon), polyisoprene, polyamides, polycarbonates, polyelectrolytes, polyesters, polyethers, polyalkylene oxides, (polyhydroxy)benzenes, polyimides, polymers containing sulfur, polyolefins, polyols, polymethylbenzenes, polystyrene, styrene copolymers, acetal polymers, acrylic polymers, acrylonitrile polymers and copolymers, polyolefins containing halogen, fluoropolymers, ionomeric polymers, polysaccharides, polymers containing ketone group(s), liquid crystal polymers, polyamide-imides, polymers containing olefinic double bond(s), polyolefin copolymers, polyphenylene oxides, polyurethanes, thermoplastic elastomers, silicone polymers, alkyd, epoxy, and unsaturated polyester or combinations thereof.

12. An aggregate having attached at least one polymer, wherein said aggregate comprises a carbon phase and a metal-containing species phase.

13. A method of making the aggregate of claim 1, comprising the step of combining an aggregate comprising at least one carbon phase and at least one silicon-containing species phase with at least one type of starting polymer having at least one functional group and mixing to the extent that the polymer is attached onto the aggregate.

14. The method of claim 13, further comprising the application of heat during the mixing.

15. The method of claim 13, wherein said functional group is a hydroxy group, silanol group, carbinol/alcohol group, Si—OR group, where R is an alkyl group, Si—X group where X is a halide, or an amine group.

* * * * *